(12) United States Patent
Kutaragi et al.

(10) Patent No.: US 6,721,264 B1
(45) Date of Patent: Apr. 13, 2004

(54) OPTICAL RECORDING MEDIUM AND ENTERTAINMENT SYSTEM THAT EMPLOYS IT

(75) Inventors: Ken Kutaragi, Kanagawa (JP); Kazuo Miura, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 09/505,538

(22) Filed: Feb. 17, 2000

(30) Foreign Application Priority Data

Feb. 19, 1999 (JP) .......................... P11-042407

(51) Int. Cl.[7] .............. G11B 3/70; G11B 7/24; G11B 7/26
(52) U.S. Cl. ................ 369/275.2; 369/272; 369/284; 369/275.1
(58) Field of Search ............ 369/275.2, 13.35, 369/30.12, 93, 94, 95, 96, 97, 98, 272, 275.1, 284

(56) References Cited

U.S. PATENT DOCUMENTS

| | | | | |
|---|---|---|---|---|
| 4,718,053 A | * | 1/1988 | Sato et al. ............ | 346/135.1 |
| 5,605,779 A | * | 2/1997 | Irie et al. ............ | 369/284 |
| 5,754,518 A | * | 5/1998 | Dang et al. ............ | 369/191 |
| 5,822,291 A | * | 10/1998 | Brindze et al. ............ | 369/14 |
| 6,310,854 B1 | * | 10/2001 | Sato et al. ............ | 369/275.3 |

FOREIGN PATENT DOCUMENTS

| | | | |
|---|---|---|---|
| CN | 1123936 | 11/1995 | |
| EP | 0642122 A1 | 3/1995 | |
| EP | 642122 A1 | * 3/1995 | .......... G11B/7/125 |
| EP | 0 684 057 | 11/1995 | |
| EP | 0741382 A1 | 11/1996 | |
| JP | 2-9032 | 1/1990 | |
| JP | 3-263618 | 11/1991 | |
| JP | 7-21585 | 1/1995 | |
| TW | 275963 | 1/1995 | |
| TW | 301744 | 4/1995 | |
| TW | 322572 | 12/1997 | |
| TW | 325563 | 1/1998 | |
| WO | WO 98/58368 | * 6/1997 | ............ G11B/7/00 |
| WO | WO 98/58368 | 12/1998 | |
| WO | WO 98/58368 A1 | * 12/1998 | ............ G11B/7/00 |

* cited by examiner

*Primary Examiner*—David Hudspeth
*Assistant Examiner*—Glenda P. Rodriguez
(74) *Attorney, Agent, or Firm*—Katten Muchin Zavis Rosenman

(57) ABSTRACT

It is an object of the present invention to provide an optical recording medium having a new information recording part and an entertainment system employing it. According to an optical recording medium of the present invention, a new information recording part (210) is formed on parts other than the information recordable part (200O, 200D, 200I), and information can be written, read, and erased.

17 Claims, 8 Drawing Sheets

OPTICAL RECORDING MEDIUM AND ENTERTAINMENT SYSTEM THAT EMPLOYS IT

BACKGROUND OF THE INVENTION

1. Field of the Invention

This invention concerns an optical recording medium that carries out new information recording using parts other than existing information recordable parts, and an entertainment system that employs it.

2. Background of the Invention

Recently there have been various types of optical recording media that employ laser light; among them, FIG. 1 shows an example of a so-called CD-ROM. This CD-ROM 200 has a disk-shape substrate formed of polycarbonate, and it has a structure in which aluminum is deposited by vapor deposition in information recordable parts where pits are formed, and it is protected by a protective layer so that the aluminum vapor deposition parts are embedded. In FIG. 1, data area 200D is formed mainly as the information recordable part.

In manufacturing CD-ROM 200, a process is adopted in which information is recorded by laser light on a resist mask disk, this is developed to make pits, a metal mask is made from a disk master, and then a stamper is made from the mother. FIG. 2A shows the state in which a transparent disk 201S, for example made of polycarbonate, is made with a stamper 203. FIG. 2B shows the state in which a metal film 204 for reflection, made of aluminum, for example, is vapor deposited. FIG. 2C shows the state in which a protective layer 205 is formed so as to embed metal film 204.

When reading the information recordable part of a CD-ROM, laser light is irradiated from below disk 201S shown in FIG. 2C, for reading the presence or absence of pits and reproducing the information.

In a CD-ROM that has a structure and manufacturing process as described above, the playback information required by the user is written into the information recordable part such as data area 200D, and it is read out. But recently, besides this playback information, it has been demanded that additional information be written, such as security information to suppress the appearance of forgery software made by illicitly copying the data recorded on the CD-ROM, and personal information such as the end user's ID number or the number of his playback device.

SUMMARY OF THE INVENTION

It is an object of this invention to provide an optical recording medium in which a new information recording part is formed so that in an optical medium, not limited to a CD-ROM, additionally required information can be written, read, or, if necessary, erased.

Yet another object of the present invention is to provide an entertainment system that employs an optical recording medium on which is formed the above-described information recording part.

The invention that accomplishes the above-described and other objects has the following invention-specified features.

(1) In an optical recording medium on which information is written and read by laser light, a new information recording part is formed in the part other than the information recordable part.

(2) In the above first aspect of the present invention, said new information recording part is at least one of a part inside the lead-in area and outside the lead-out area of the optical recording medium.

(3) In the above first aspect of the present invention, said new information recording part is formed of a material that changes by means of laser light.

(4) In the above first aspect of the present invention, said new information recording part is made so that information recording is done by either reaction or discoloration of a photosensitive material due to irradiation of laser light.

(5) In the above first aspect of the present invention, said new information recording part erases information by uniform reaction or discoloration of a photosensitive material due to irradiation of laser light.

(6) In the above first aspect of the present invention, at least either security information or personal information is recorded on said new information recording part.

(7) In an optical recording medium in which information is written and read by laser light, the laser light that either records, plays back, or erases information of the new information recording part on the part other than the information recordable part is either laser light for reading on the user side or high-output laser light.

(8) An entertainment system is suggested, on which one plays games with an optical recording medium on which information is written and read by laser light, by reading a game program that is recorded on said information recordable part of the optical recording medium on which is formed, on the part other than the information recordable part, a new information recording part.

(9) In the above eighth aspect of the present invention, said new information recording part in the entertainment system records at least either security information or personal information.

(10) In the entertainment system of the eighth aspect, the recording, playback, and erasing of information to said new information recording part is done by either laser light for reading or high-output laser light.

DETAILED DESCRIPTION OF THE PREFERRED EMBODIMENT

Here an embodiment of this invention, with reference to FIGS. 3 and 4 will be described.

Figure 3:
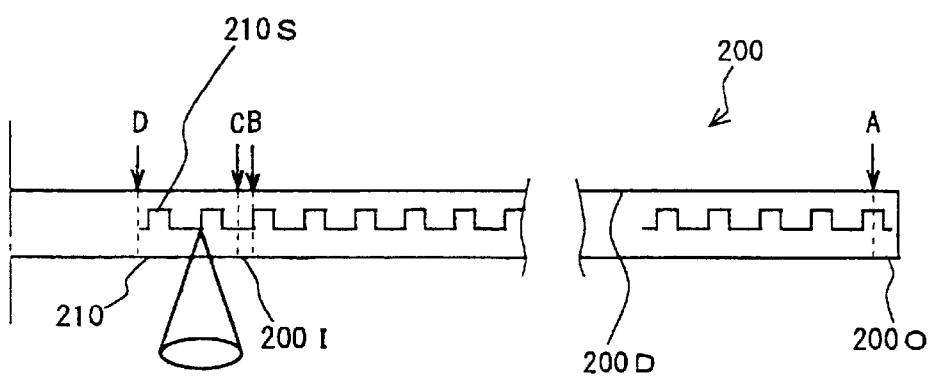
FIG. 3 is a diagram showing the final parts of the manufacturing process of an optical recording medium of the present invention.

FIG. 3 is a cross-sectional view of a CD-ROM that is an embodiment of this invention. In the cross-section of CD-ROM 200, the right-side end in the drawing represents the outer peripheral end face of CD-ROM 200, and the left-side end represents the inner peripheral end face. The area between arrow A and the right-side end is a lead-out area 200O, the area between arrows A and B is data area 200D, and the area between arrows B and C is a lead-in area 200I.

Figure 1:
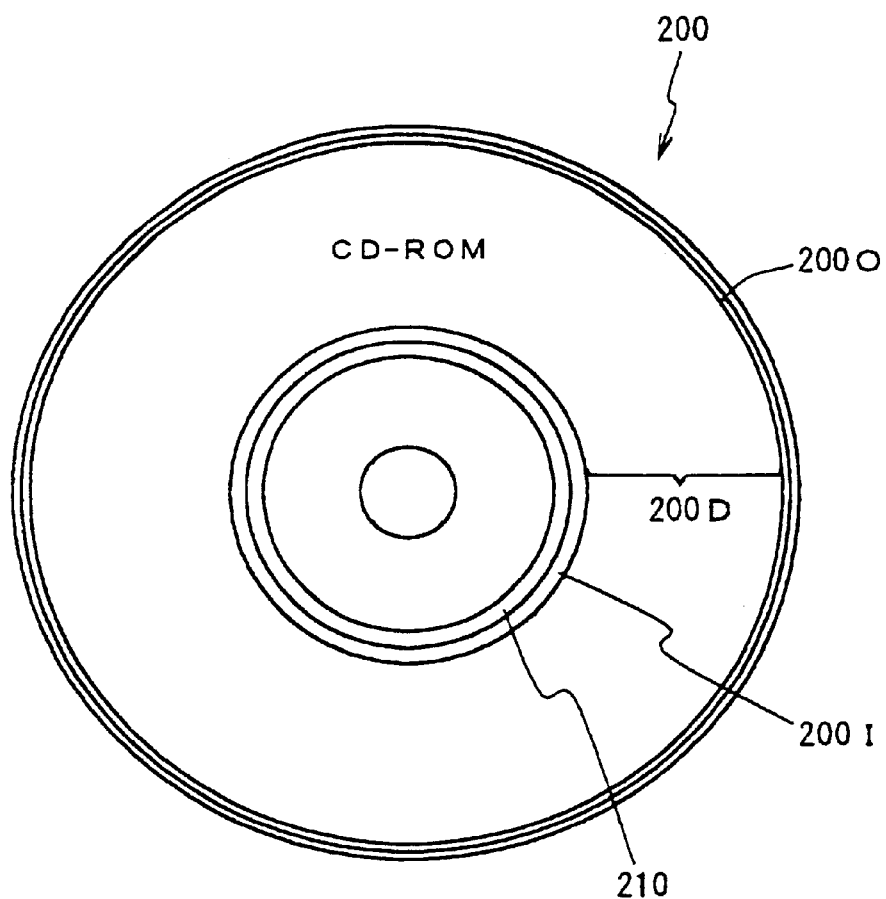
FIG. 1 is a plan view of a conventional CD-ROM.
Figure 2A:
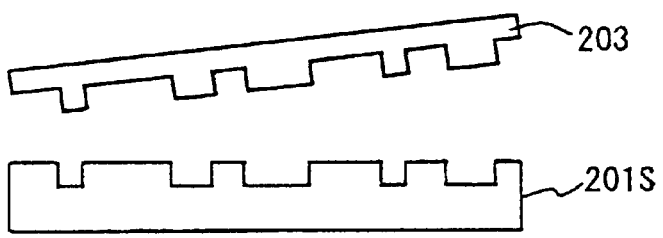
FIGS. 2A to 2C diagrammatically show the final parts of a disk manufacturing process of the prior art.
Figure 2B:
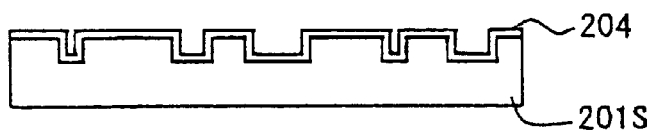
Figure 2C:
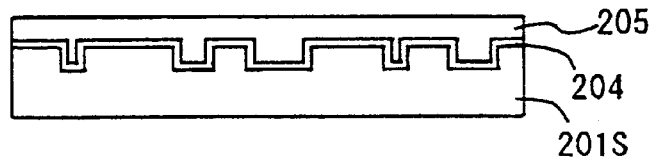

Also, the area between arrow D and the left-side end is a clamping area. In this example, a new information recording part 210 is formed inside the lead-in area 200I between arrows D and C (see also FIG. 1).

Provided in this new information recording part 210 is a material that changes if subjected to laser light. In this case, examples such as the following can be suggested as examples in which irradiation of laser light causes changes: (1) a material that is sensitive to laser light is mixed in with polycarbonate, (2) a photosensitive material is embedded in a part of the optical disk area, and (3) the region of part of the optical disk area is coated with a photosensitive material. That is, irradiation of laser light is taken as a reaction due to photosensitivity. Alternately, (4) aluminum vapor deposition film 210S, which is much thinner than the aluminum vapor deposition film formed on data area 200D, is previously formed as shown in FIG. 3, and it is discolored by irradiation of laser light, and the irradiation of laser light is taken as a reaction by discoloration of the optical disk.

Information such as security information or personal information can be recorded by the pattern of reaction of this photosensitive material or the discoloration of the aluminum vapor deposition film.

In this case, the recording of information can be done, besides when the CD-ROM is made, by laser light of the playback device on the user side, as is possible even with the end user, that is, information can be written by laser light for reading or by laser light in which the laser power for reading is a little increased.

Also, information can be erased by obtaining a uniform reaction or discoloration by uniform writing to all of new information recording part 210 with the user-side laser light.

With the writing of information, for example, writing it in as security information when the CD-ROM is made, this security information may be recognized and stored on the side of the playback machine by the end user at the time of playback, or the end user may subsequently erase it by writing in uniform information as described above. Also, as personal information, an ID number or other information can be written by the end user. Thus, concerning the recording, playback, and erasing of information on new information recording part 210, according to the purpose of the information, recording is done when the CD-ROM is made, or recording, playback, and erasing is done by the end user with laser light whose laser power for reading is increased or by laser light for reading.

While it has been described a case in which the area inside the lead-in area is made into the new information recording part, it can also be done at the area outside the lead-out area.

The above description is applied to a CD-ROM. However, but the new information recording part can also be formed in another light recording medium by laser light.

Figure 4:
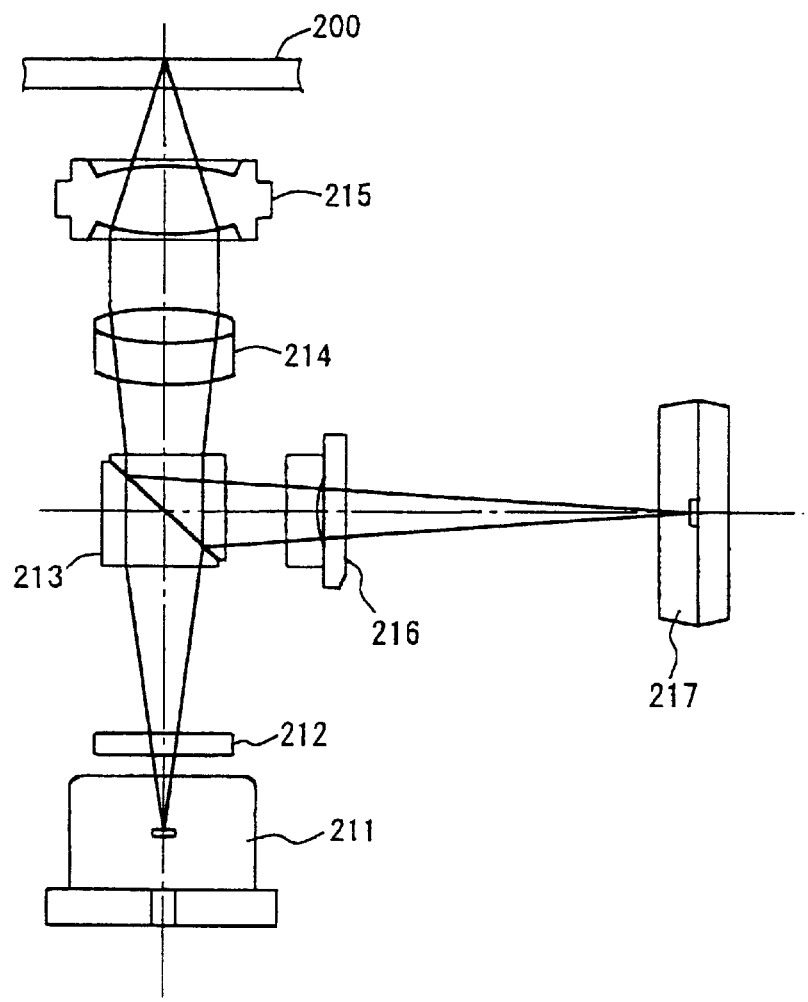
FIG. 4 shows a schematic structure of a CD-ROM playback machine.

With respect to CD-ROM 200, FIG. 4 diagrammatically shows a CD-ROM playback machine. Laser light from a laser emitter 211 which travels through a beam splitter 213 via a diffraction grating 212 to the CD-ROM 200 chucked by the machine, is divided by a collimator lens 214 into a parallel beam which are collected by objective lens 215.

The reflected light read from CD-ROM 200 travels through the collimator lens 214, is reflected by the beam splitter 213, and is made incident on a photodiode 217 via a lens 216. Here, concerning CD-ROM 200, reading, playback, or erasing of information is done by said reading laser light with respect to the new information recording part, and the reading and erasing of information is done by laser light that is more intense than the reading laser light. Here, the laser light having more intensity than the reading laser light is obtained by increasing the output of the laser emitter or by increasing its degree of light convergence, and this can be done by manipulation such as switching the supplied power to the laser emitter or by switching of the optical system.

FIGS. 5 to 8 show an entertainment system which is a video game machine, and the CD-ROM which is the above-described embodiment is shown as an optical recording medium loaded on this video game machine.

Figure 5:
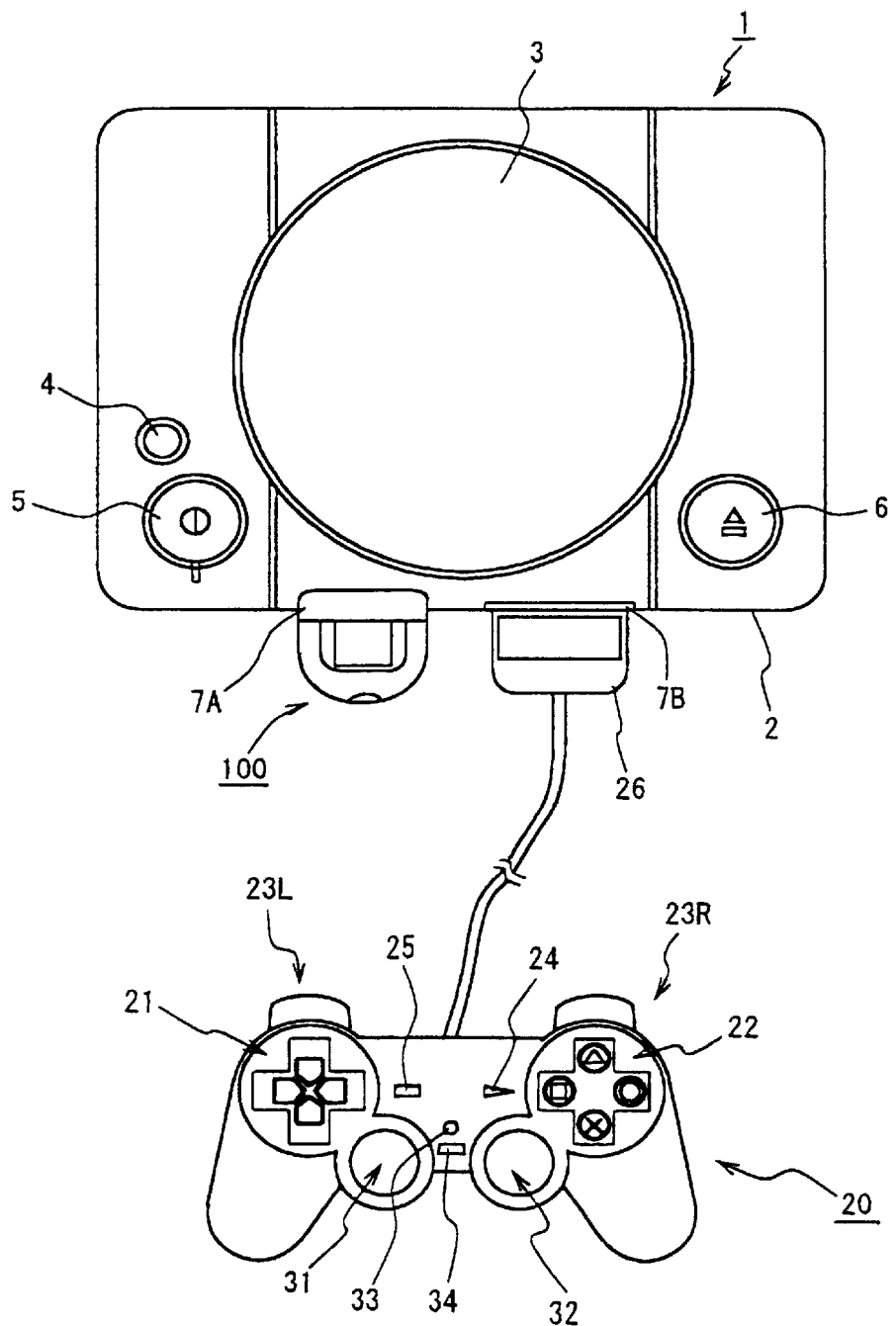
FIG. 5 is a plan view of a video game device.

FIG. 5 diagrammatically shows a video game machine as an example of an entertainment system. A video game device 1 is used, for example, for reading a game program recorded on an optical disk, etc. and executing it in accordance with instructions from the user (game player). Execution of a game means mainly controlling the progress, display, and sound of a game.

A main unit 2 of the video game device 1 has a disk loading unit 3, in the center of which is loaded a CD-ROM or other optical disk, which is a recording medium for supplying video games or other application programs or for recording security information or personal information, a reset switch 4 for resetting the game at will, a power switch 5, a disk operation switch 6 for operating the loading of the optical disk, and, for example, two slots 7A and 7B.

Two operation devices or controllers 20 can be connected to slots 7A and 7B, allowing two users to play competitive games, etc. One can also insert into these slots 7A and 7B memory card devices that can save and read (memorize) game data, or portable electronic devices that can execute a game with being separated from the main unit.

Operation device or controller 20 has first and second operation units 21 and 22, left-hand button 23L and right-hand button 23R, a start button 24, a selection button 25, operation units 31 and 32 that are capable of analog operation, a mode selector switch 33 that selects the operation mode of these operation units 31 and 32, and a display unit 34 for displaying the selected operation mode.

Figure 6:
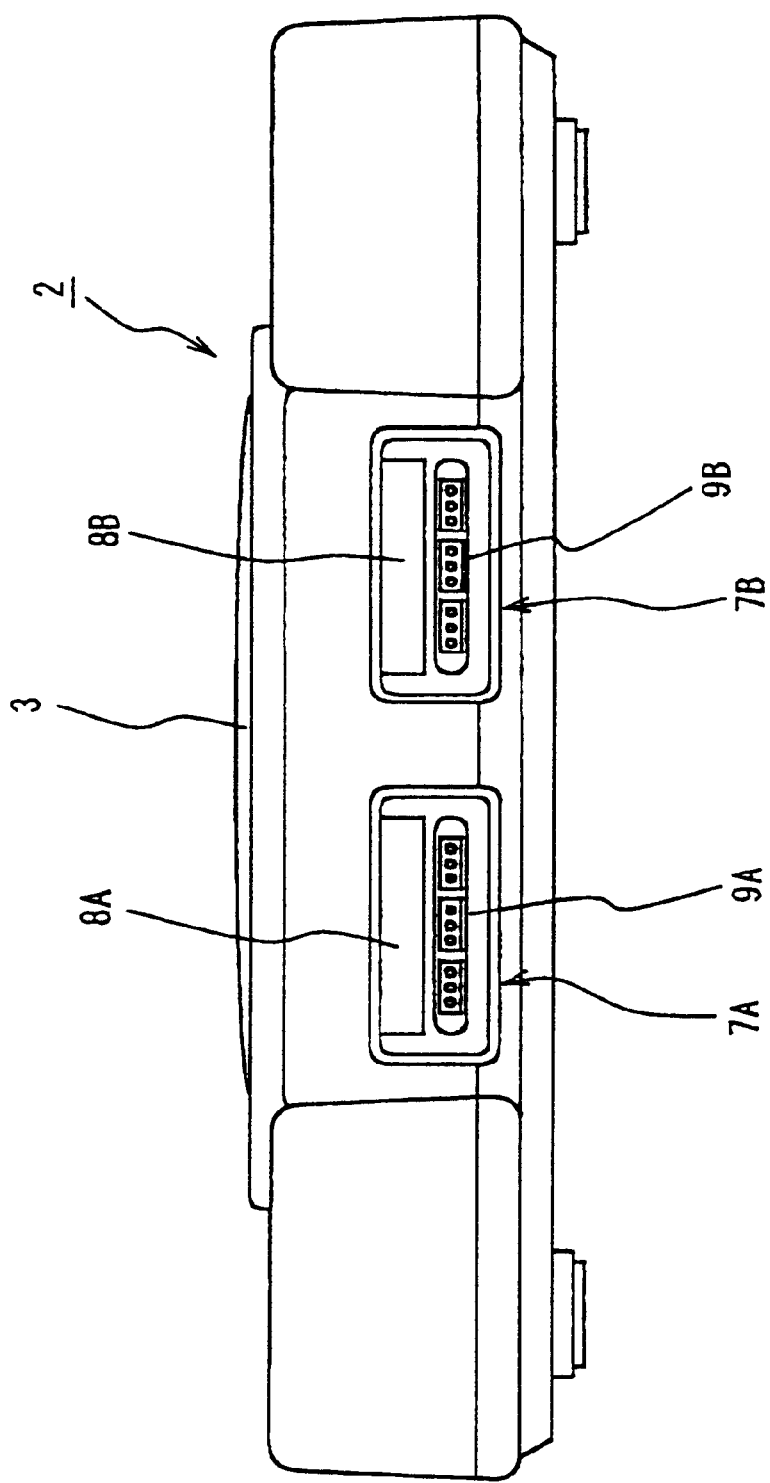
FIG. 6 is a rear view of the video game device, used to explain its slots.

FIG. 6 shows the video game device 1 with slots 7A and 7B provided in the front of main unit 2 of video game device 1. Slots 7A and 7B each are formed in two levels; provided on the upper level are memory card insertion units 8A and 8B into which a memory card 10 or a portable electronic device 100 is inserted, and provided on the lower level are controller connection units (jacks) 9A and 9B to which is connected the connection terminal part (connector) 26 of controller 20.

The insertion hole (slot) of memory card insertion units 8A and 8B is formed somewhat asymmetrically, with a structure that prevents a memory card from being erroneously inserted. Controller connection units 9A and 9B are likewise formed somewhat asymmetrically, with a structure that prevents connection terminal part 26 of controller 20 from being erroneously connected; in addition, their insertion hole is shaped differently from memory card insertion units 8A and 8B to prevent a memory card from being erroneously inserted.

Figure 7:
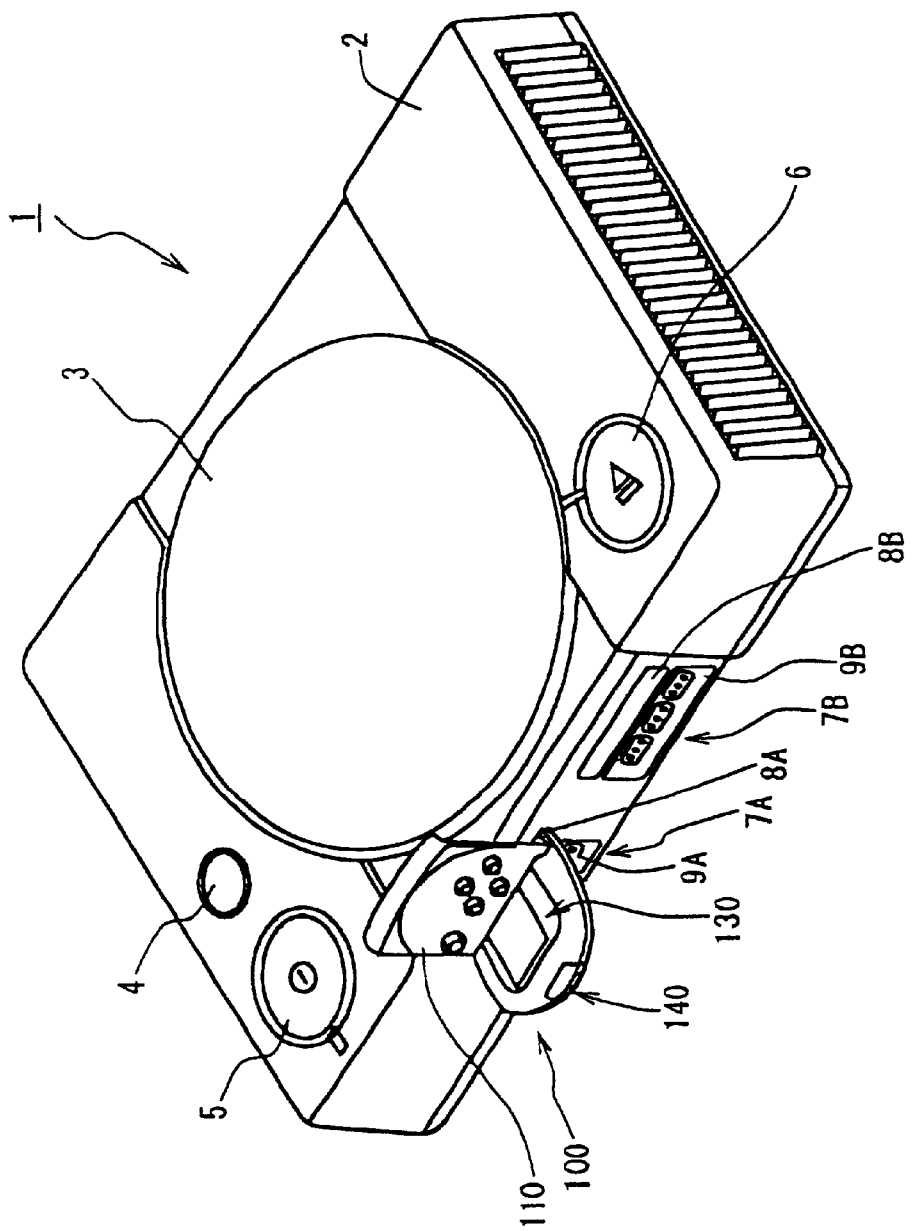
FIG. 7 is a perspective view of the video game device.

FIG. 7 shows the state in which portable electronic device 100 is inserted into memory card insertion unit 8A at slot 7A provided on the front of video game device 1.

Figure 8:
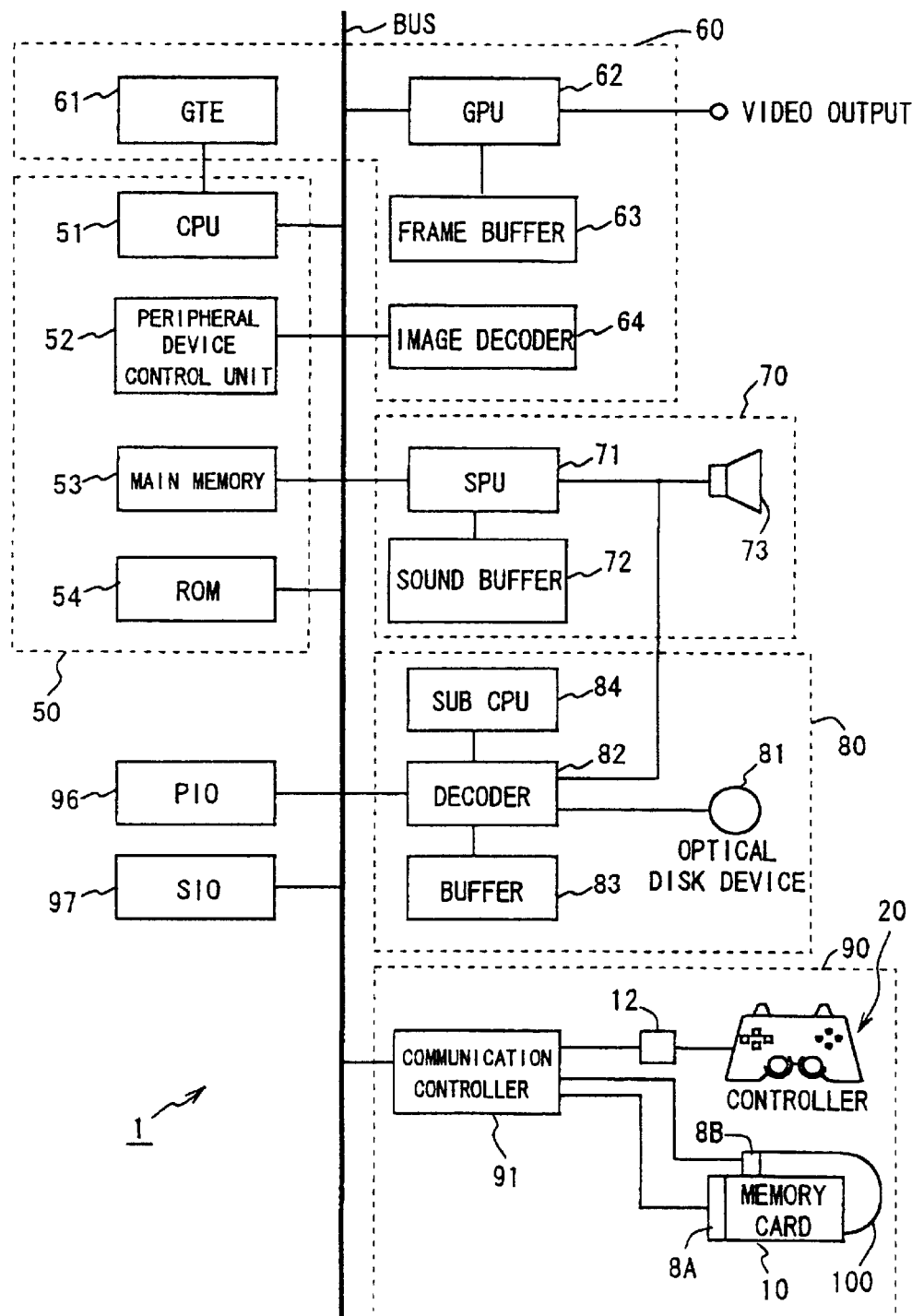
FIG. 8 is a block diagram of an example of the specific composition of the main parts of the video game machine.

Next, FIG. 8 is a block diagram showing an example of the schematic circuit composition of the main part of video game device 1.

The video game device 1 includes a control system 50 which in turn includes a central processing unit (CPU) 51 and its peripheral devices; a graphic system 60, which includes a graphic processing unit (GPU) 62, which draws to frame buffer 63, and so on; a sound system 70 which includes a sound processing unit (SPU) 71 which generates music and sound effects; an optical disk controller 80 which controls an optical disk on which application programs are recorded and which is used for recording security information and personal information; a communication controller 90 which controls the input and output of signals from controller 20 to which instructions from and to the user are input, and data from the memory card 10, on which game settings, etc. are stored, and portable electronic device 100, and a bus BUS, to which the aforesaid units are connected.

Control system 50 has in addition to CPU S1, a peripheral device controller 52 which performs interrupt control and control of direct memory access (DMA) transfers, etc.; a main memory 53 which consists of random access memory (RAM); a main memory 53 and a read-only memory (ROM) 54, in which are stored programs such as the so-called operating system which manages graphic system 60, sound system 70, etc. As the term used here, the main memory is able to execute programs in that memory.

CPU 51 is one that controls the whole video game device 1 by executing the operating system stored in ROM 54, and consists of, for example, a 32-bit RISC (reduced instruction set computer) CPU.

In the video game device 1, when the power is turned on, CPU 51 of control system 50 executes the operating system stored in ROM 54, and thereby CPU 51 controls graphic system 60, sound system 70, etc.

Also, when the operating system is executed, CPU 51 performs initialization of the entire video game device 1, including confirmation of operation, and then controls optical disk controller 80 to execute the game or other application program stored on the optical disk. By execution of this game or other program, CPU 51, in accordance with input from the user, controls graphic system 60, sound system 70, etc. and also controls the display of images and the generation of sound effects and musical sound. With the optical disk controller, security information is read and erased, and personal information is recorded, played back, and erased.

Also, graphic system 60 has a geometry transfer engine (GTE) 61 which executes processing such as coordinate transformations; a GPU 62 which draws in accordance with drawing instructions from CPU 51; a frame buffer 63 which stores images drawn by the GPU 62; and an image decoder 64 which decodes image data compressed and encoded by orthogonal transformations such as discrete cosine transformations.

GTE 61 has, for example, a parallel computation mechanism that executes multiple operations in parallel, and is able to perform at high speed such calculations as coordinate transforms, light source calculations, and matrix or vector calculations in response to calculation requests from CPU 51. Specifically, in the case of operations in which flat shading is done, wherein, for example, a single triangle-shaped polygon is drawn with the same color, this GTE 61 is able to perform coordinate calculations for up to about 1.5 million polygons per second, thereby making it possible, with this video game device, to both reduce the burden on CPU 51 and perform high-speed coordinate operations.

Also, GPU 62 draws polygons, etc. to frame buffer 63 in accordance with drawing commands from CPU 51. The GPU 62 is able to draw up to about 360,000 polygons per second.

In addition, the frame buffer 63 which consists of a so-called dual-port RAM, is able to simultaneously carry out drawing from GPU 62 or transfers from main memory, and reading for the sake of display. The frame buffer 63 has a capacity of, for example, 1 megabyte and can handle a matrix consisting of 1024 pixels horizontally and 512 pixels vertically, each pixel being 16 bits. The frame buffer 63 has, besides a display region that is output as video output, a CLUT region in which is stored a color look-up table (CLUT) that is referenced when GPU 62 draws polygons, etc., and a texture region in which is stored the texture that is coordinate-transformed and mapped into polygons, etc. to be drawn by GPU 62 when drawing is done. The CLUT and texture regions dynamically change as the display region changes, etc.

Moreover, GPU 62 can do, besides the aforesaid flat shading, Gourod shading, in which the color within a polygon is determined by interpolation from the colors at the vertices of the polygon, and texture mapping, in which a texture stored in the texture region is put onto a polygon. If this Gourod shading or texture mapping is done, GTE 61 can perform coordinate operations for up to about 500,000 polygons per second.

In addition, the image decoder 64 decodes the image data of still pictures or moving pictures stored in main memory 53 and stores the result into main memory 53, under control from CPU 51.

Also, this generated image data can be used as background for images drawn by the GPU 62, by storing it into frame buffer 63 via GPU 62.

Sound system 70 has a SPU 71 which generates musical sound and sound effects based upon instructions from CPU 51; a sound buffer 72 in which waveform data, etc. is stored by SPU 71; and a speaker 73 which emanates the musical sound and sound effects generated by SPU 71.

SPU 71 has, for example, an ADPCM (adaptive differential PCM) decoding function that regenerates audio data in which 16-bit audio data is adaptively encoded by ADPCM as 4-bit difference signals; a playback function that plays back sound effects, etc. by playing back the waveform data stored in sound buffer 72; and a modulation function that modulates and plays back the waveform data stored in sound buffer 72.

With such functions, sound system 70 can be used as a so-called sampling sound source, which generates musical sound and sound effects based on waveform data stored in sound buffer 72 under instructions from CPU 51.

Optical disk controller 80 includes an optical disk device 81 which plays back the programs and data, including security data, etc. that are recorded on an optical disk; a decoder 82 which decodes programs and data, etc. that have been recorded, for example, with an added error correction code (ECC); and a buffer 83 which speeds up the reading of data from the optical disk by temporarily storing therein data from optical disk device 81. A sub-CPU 84 is connected to decoder 82.

Also, as audio data that is read by optical disk device 81 and is recorded on the optical disk, there is, besides the aforesaid ADPCM data, so-called PCM data, in which an analog/digital conversion is performed on audio signals. Also, as described above, optical disk controller 80 also has the function of erasing security information and the function of recording and erasing personal information.

As an example of ADPCM data, audio data in which the differences of 16-bit digital data are expressed in 4 bits and are recorded is decoded by decoder 82, then it is supplied to aforesaid SPU 71, then processing such as digital/analog conversion is carried out on it by SPU 71, and then it is used for driving speaker 73.

As an example of PCM data, audio data recorded as 16-bit digital data is decoded by decoder 82 and is then used for driving speaker 73.

In addition, the communication controller 90 includes a communication control machine 91 which controls communication with CPU 51 via bus BUS. Provided on control machine 91 are controller connection units 9A, 9B to which is connected controller 20 which inputs instructions from the user, and memory card insertion units 8A and 8B, to which are connected memory card 10 as an auxiliary memory device that stores game settings data, etc., and the portable electronic device 100.

Controller 20, which is connected to controller connection unit 9A, 9B, has, for example, 16 instruction keys for inputting instructions from the user, and it sends the state of these instruction keys to communication control machine 91 by synchronous communication about 60 times a second, in accordance with instructions from communication control machine 91. And communication control machine 91 sends the state of the instruction keys of controller 20 to CPU 51.

Thus, instructions from the user are input into CPU 51, and CPU 51 performs processing in accordance with the instructions from the user based on the game program, etc. it is executing.

Here, it is necessary to transfer a large quantity of image data at high speed among main memory 53, GPU 62, image decoder 64, and decoder 82, etc. when reading a program, displaying images, or drawing, etc. In the video game device, as described above, it is possible to carry out so-called DMA transfers, in which data is directly transferred among main memory 53, GPU 62, image decoder 64, and decoder 82, etc. under control from peripheral device controller 52 without being transferred through CPU 51. This makes it possible to reduce the burden on CPU 51 that is caused by transferring data and to perform high-speed data transfers.

When it is necessary to store the settings data, etc. of the game that is being played, CPU 51 sends the data to be stored to communication control machine 91, and communication control machine 91 writes the data from CPU 51 into memory card 10 or portable electronic device 100 inserted in the slot of memory card insertion unit 8A or memory card insertion unit 8B.

Here a protection circuit to prevent electrical damage is built into communication control machine 91. Memory card 10 and portable electronic device 100 are separated from bus BUS and can be attached or detached while the power to the main unit of the device is turned on. Therefore even if there is no longer enough memory capacity in said memory card 10 or portable electronic device 100, a new memory card can be inserted without turning off the power to the main unit of the device. Thus game data that needs to be backed up is not lost, and by inserting a new memory card, the necessary data can be written onto the new memory card.

Also, an input-output interface (PIO) 96 and a serial input-output interface (SIO) 97 installed in parallel are interfaces for connecting memory card 10 or portable electronic device 100 and video game device 1.

As described above, with the present invention, an information recording part can be formed in addition to the existing information recordable part, and it can be used as a security or personal information source. An optical recording medium can be obtained and an entertainment system can be obtained as desired.

What is claimed is:

1. An optical recording medium having a surface on which information is written and/or read by laser light, comprising
   a first information recording part formed from a first material and a second information recording pan formed from a second material,
   said first and second information recording parts being radially divided along the surface of the optical recording medium,
   wherein said first material has a composition that does not change when subjected to a laser light adaptable for reading said first material, and
   wherein said second material is photosensitive and changes material properties when subjected to said laser light adaptable for reading said first material.

2. The optical recording medium as described in claim 1, wherein said second recording part is provided on at least one of an area inside a lead-in area and an area outside a lead-out area of the optical recording medium.

3. The optical recording medium as described in claim 1, wherein said second information recording part is made such that said laser light causes a discoloration of said photosensitive second material.

4. The optical recording medium as described in claim 1, wherein at least one of security information and personal information is recorded on said second information recording part.

5. The optical recording medium as described in claim 1, wherein said photosensitive second material is mixed in polycarbonate forming the optical recording medium.

6. The optical recording medium as described in claim 1, wherein said photosensitive second material is embedded in said second information recording part.

7. The optical recording medium as described in claim 1, wherein said photosensitive second material is coated onto said second information recording part.

8. The optical recording medium as described in claim 1, wherein said second information recording part is provided on an area outside a lead-out area of said optical recording medium.

9. An optical recording medium having a surface on which information is written and/or read by laser light, comprising:
   a first information recording part formed from a first material and a second information recording part formed from a second material,
   said first and second information recording parts being radially divided along the surface of the optical recording medium,
   wherein said first material has a composition that does not change when subjected to a laser light adapted for reading said first material,
   wherein said second material is photosensitive and changes material properties when subjected to one of said laser light adapted for reading said first material and a high-output laser light, and
   wherein information of said second information recording part is erased by one of a uniform reaction and a discoloration of said photosensitive second material due to irradiation of laser light.

10. An optical recording medium having a surface on which information is written and/or read by laser light comprising:
    a first information recording part formed from a first material and a second information recording part formed from a second material, said first and second information recording parts being radially divided alone the surface of the optical recording medium, wherein said first material has a composition that does not change when subjected to a laser light adapted for reading said first material, wherein said second material is photosensitive and changes material properties when subjected to one of said laser light adapted for reading said first material and a high-output laser light, and wherein said second material is photosensitive and chances material properties when subjected to said laser light adapted for reading said first material and when subjected to high-output laser light.

11. A computer system operable to read a program in combination with an optical recording medium on which program information is written and/or read by laser light, said optical recording medium comprising:

a first information recording part formed from a first material and a second information recording part formed from a second material, said first and second information recording parts being radially divided along the surface of the optical recording medium, wherein said first material has a composition that does not change when subjected to a laser light adaptable for reading said first material, and wherein said second material is photosensitive and changes material properties when subjected to said laser light adaptable for reading said first material.

12. The computer system as described in claim 11, wherein in said second information recording part is recorded at least one of security information and personal information.

13. The computer system as described in claim 11, wherein said program is a game program.

14. The computer system as described in claim 11, wherein said computer system is operable to read information from and/or write information to said second information recording part of said optical recording medium.

15. A computer system is operable to read a program in combination with an optical recording medium on which program information is written and/or read by laser light, said optical recording medium comprising:

a first information recording part formed from a first material and a second information recording part formed from a second material, said first and second information recording parts being radially divided along the surface of the optical recording medium, wherein said first material has a composition that does not change when subjected to a laser light adapted for reading said first material, wherein said second material is photosensitive and changes material properties when subjected to one of said laser light adapted for reading said first material and a high-output laser light, and wherein said second material is photosensitive and changes material properties when subjected to said laser light adapted for reading said first material and when subjected to high-output laser light.

16. An optical recording medium having a surface on which information is written and/or read by laser light, comprising:

a first information recording part formed from a first material and a second information recording part formed from a second material, said first and second information recording pans being radially divided along the surface of the optical recording medium, wherein said first material has a composition that does not chance when subjected to a laser light adapted for reading said first material, wherein said second material is photosensitive and changes material properties when subjected to one of said laser light adapted for reading said first material and a high-output laser light, and wherein said first ad second information recording materials include first and second aluminum vapor deposition films formed thereon and wherein said second aluminum vapor deposition film is thinner than said first aluminum vapor deposition film.

17. An optical recording medium having a surface on which information is written and/or read by laser light, comprising:

a first information recording pan formed from a first material and a second information recording part formed from a second material, wherein said first material has a composition that does not change when subjected to a laser light adaptable for reading said first material, and wherein said second material is photosensitive and changes material properties when subjected to said laser light adaptable for reading said first material.

* * * * *